US012799362B2

(12) United States Patent
Ko et al.

(10) Patent No.: US 12,799,362 B2
(45) Date of Patent: Nov. 17, 2026

(54) TITANIUM DIOXIDE CHEMICAL-MECHANICAL POLISHING COMPOSITION FOR POLISHING NICKEL SUBSTRATES

(71) Applicant: ENTEGRIS, INC., Billerica, MA (US)

(72) Inventors: Cheng-Yuan Ko, Aurora, IL (US); Jin-Hao Jhang, Aurora, IL (US)

(73) Assignee: CMC Materials LLC, Aurora, IL (US)

( * ) Notice: Subject to any disclaimer, the term of this patent is extended or adjusted under 35 U.S.C. 154(b) by 502 days.

(21) Appl. No.: 18/383,364

(22) Filed: Oct. 24, 2023

(65) Prior Publication Data

US 2024/0174891 A1 May 30, 2024

Related U.S. Application Data

(60) Provisional application No. 63/426,228, filed on Nov. 17, 2022.

(51) Int. Cl.
*C09G 1/02* (2006.01)
*B24B 37/04* (2012.01)
*C09K 3/14* (2006.01)

(52) U.S. Cl.
CPC .............. *C09G 1/02* (2013.01); *B24B 37/044* (2013.01); *C09K 3/1436* (2013.01)

(58) Field of Classification Search
CPC .......... C09G 1/02; B24B 37/044; C09K 3/14; C09K 3/1436
See application file for complete search history.

(56) References Cited

U.S. PATENT DOCUMENTS 5,667,567 A * 9/1997 Masumura ............ B24B 37/042 106/3
6,152,976 A 11/2000 Ishitobi
6,478,837 B1 11/2002 Miyata
6,604,987 B1 8/2003 Sun
2009/0081927 A1* 3/2009 Grumbine ............. B24B 37/044 451/36
2012/0094487 A1* 4/2012 Kranz ................... B24B 37/044 438/692
2015/0159048 A1 6/2015 Yoshida
2022/0033683 A1 2/2022 Jhang
2023/0002640 A1 1/2023 Nishimura

FOREIGN PATENT DOCUMENTS

CN 1315991 A 10/2001
CN 106676605 B 7/2018
CN 110835119 A 2/2020
TW 202132527 A 9/2021

* cited by examiner

*Primary Examiner* — Pegah Parvini

(57) ABSTRACT

The invention provides a chemical-mechanical polishing composition comprising: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12. The invention also provides a method of chemically-mechanically polishing a substrate, especially a substrate comprising a nickel layer on a surface of the substrate, using a chemical-mechanical polishing composition comprising a rutile titanium dioxide abrasive.

18 Claims, No Drawings

TITANIUM DIOXIDE CHEMICAL-MECHANICAL POLISHING COMPOSITION FOR POLISHING NICKEL SUBSTRATES

BACKGROUND OF THE INVENTION

In the fabrication of integrated circuits and other electronic devices, multiple layers of conducting, semiconducting, and dielectric materials are deposited onto or removed from a substrate surface. As layers of materials are sequentially deposited onto and removed from the substrate, the uppermost surface of the substrate may become non-planar and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Compositions and methods for planarizing or polishing the surface of a substrate are well known in the art. Chemical-mechanical planarization, or chemical-mechanical polishing (CMP), is a common technique used to planarize substrates. CMP utilizes a chemical composition, known as a CMP composition or more simply as a polishing composition (also referred to as a polishing slurry) for selective removal of material from the substrate. Polishing compositions typically are applied to a substrate by contacting the surface of the substrate with a polishing pad (e.g., polishing cloth or polishing disk) saturated with the polishing composition. The polishing of the substrate typically is further aided by the chemical activity of the polishing composition and/or the mechanical activity of an abrasive suspended in the polishing composition or incorporated into the polishing pad (e.g., fixed abrasive polishing pad).

The chemical-mechanical polishing of nickel (Ni) is becoming increasingly important in the preparation of nickel-based materials for memory applications. Although compositions designed for polishing other metals such as copper (Cu) and cobalt (Co) are known in the art, these polishing compositions do not provide satisfactory polishing performance for nickel. In particular, polishing compositions which are satisfactory for other metals may not provide satisfactory nickel removal rates, while providing the necessary selectivity for nickel in the presence of other dielectric materials (e.g., silicon oxide).

A need remains for polishing compositions and methods that provide effective nickel removal rates, while providing the necessary selectivity for nickel in the presence of other dielectric materials. The invention provides such polishing compositions and methods. These and other advantages of the invention, as well as additional inventive features, will be apparent from the description of the invention provided herein.

BRIEF SUMMARY OF THE INVENTION

The invention provides a chemical-mechanical polishing composition comprising: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12.

The invention also provides a method of chemically-mechanically polishing a substrate comprising: (i) providing a substrate comprising nickel on a surface of the substrate, (ii) providing a polishing pad, (iii) providing a chemical-mechanical polishing composition comprising a rutile titanium dioxide abrasive, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

The invention further provides a method of chemically-mechanically polishing a substrate comprising: (i) providing a substrate comprising nickel on a surface of the substrate, (ii) providing a polishing pad, (iii) providing a chemical-mechanical polishing composition comprising: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

DETAILED DESCRIPTION OF THE INVENTION

The invention provides a chemical-mechanical polishing composition comprising a rutile titanium dioxide abrasive. In particular, in certain embodiments, the invention provides a chemical-mechanical polishing composition comprising: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12.

The polishing composition comprises a rutile titanium dioxide abrasive. As used herein, the terms "abrasive" and "abrasive particle" can be used interchangeably, and can refer to any dispersion of abrasive particles. In other words, the terms "abrasive" and "abrasive particle" can be used interchangeably, and can refer to (i) a plurality of a single type of abrasive or abrasive particle and/or (ii) a plurality of more than one type of abrasive or abrasive particle.

Titanium dioxide exists as at least seven polymorphs, of which four exist in nature. The three most common natural forms of titanium dioxide are rutile, anatase, and brookite, with the rutile and anatase forms being the forms typically obtained via synthesis. All forms of titanium dioxide possess the same empirical formula, $TiO_2$, but each has a different crystal structure. The rutile form ("rutile") is the most thermodynamically stable form of titanium dioxide. The crystal structure of rutile is tetragonal in which the Ti—O octahedra share four edges. The anatase form ("anatase") has a tetragonal crystal structure similar to rutile, except that the Ti—O octahedra share four corners instead of four edges. Anatase converts spontaneously into the more stable rutile at temperatures above about 915 °C. The brookite form ("brookite"), which is the least common of the three common forms and which is rarely used commercially, has an orthorhombic crystal structure which converts spontaneously into rutile at temperatures around 750 °C.

A large number of preparative methods for titanium dioxide are known in the art. Synthetic methods include vapor-phase synthesis and solution-phase synthesis. In vapor-phase synthesis of titanium dioxide, a volatilized titanium (IV) compound is mixed with water vapor and/or oxygen, and the gaseous stream is passed through a heated zone in order to hydrolyze the titanium (IV) compound and produce titanium dioxide. The thus-produced titanium dioxide is isolated by cooling the gaseous stream and collecting particulate titanium dioxide. For example, U.S. Pat. No. 4,842,832 teaches a method of synthesizing titanium dioxide wherein a volatile titanium (IV) compound, such as titanium tetrachloride or a titanium tetraalkoxide compound, is vaporized, the vapors are combined with water vapor and/or oxygen and a carrier gas, and the resulting gaseous mixture is heated in the gas phase to a temperature of 250-600 °C. The vapor is then cooled to provide spherical titanium dioxide particles which can be amorphous, rutile, anatase, or a mixture thereof. U.S. Pat. No. 4,241,042 describes a method of synthesizing titanium dioxide wherein a liquid aerosol of a hydrolyzable titanium (IV) compound such as titanium tetrachloride or a titanium tetraalkoxide compound is contacted with water vapor in a carrier gas and heated, optionally in the presence of a nucleating agent. The vapor is subsequently cooled to provide spherical particles of titanium dioxide. The spherical particles can be subjected to a thermal treatment step at 250-1100 °C, before or after a recovery step, which thermal treatment step increases the percentage of the spherical titanium dioxide particles which are rutile.

A large number of solution-phase syntheses of titanium dioxide are known in the art. Methods allowing for the preparation of titanium dioxide particles having particular rutile/anatase ratios are well known in the literature. For example, the preparation of titanium dioxide particles via precipitation from solutions of titanium (IV) salts produces mixtures of particles having rutile and anatase forms, with the proportions of rutile and anatase are dependent, in part, on the particular titanium (IV) compound used as starting material, as well as on the specific reaction conditions (see, e.g., Wilska, *Acta Chemica Scandinavica,* 8:1796-1801 (1954)).

The phase content of the titanium dioxide (i.e., the weight ratio of rutile to anatase) can be determined via a number of techniques. One suitable technique is X-ray diffraction (XRD). Rutile and anatase exhibit X-ray diffraction patterns having distinct peaks, both individually as pure crystallites and when present together in a particular sample of titanium dioxide. The ratio of the intensity of the peaks (i.e., lines) in a mixed sample containing both rutile and anatase can be correlated to the concentrations of rutile and anatase via the use of calibration curves, obtained by preparing mixtures of rutile and anatase having known amounts of each crystallite and by obtaining an x-ray diffraction thereof. Although the line intensity as a function of concentration is not equal for rutile and for anatase, the determination of the ratio of line intensity for rutile and anatase in a sample containing both is a useful approximation of the weight ratio of rutile and anatase in the sample. See, e.g., Wilska, supra., and references cited therein. Typically, the useful x-ray diffraction line characteristic of rutile has a d-spacing of about 3.24 Å, and the useful x-ray diffraction line characteristic of anatase has a d-spacing of about 3.51 Å.

The rutile titanium dioxide abrasive can be added as a titanium dioxide abrasive mixture comprising rutile titanium dioxide and anatase titanium dioxide. In some embodiments, the x-ray diffraction pattern of the titanium dioxide abrasive has a ratio of X/Y of about 0.5 or more, wherein X is the intensity of a peak in an x-ray diffraction curve representing a d-spacing of about 3.24 Å and is correlated with the rutile content of the particles, and Y is the intensity of a peak in an x-ray diffraction curve representing a d-spacing of about 3.51 Å and is correlated with the anatase content of the sample. In other words, the majority of the titanium dioxide abrasive is in the form of rutile titanium dioxide. Preferably, the ratio X/Y is greater than or equal to 0.75 (e.g., about 1 or more, or about 1.5 or more, or about 2 or more, or even about 3 or more). In certain embodiments, the titanium dioxide abrasive consists substantially of rutile (i.e., about 95% or more of the particles are rutile), in which case the ratio X/Y tends toward infinity. In an embodiment, the titanium dioxide abrasive consists solely of the rutile form (i.e., the intensity of the peak in an x-ray diffraction curve representing a d-spacing of about 3.51 Å is undetectable). In some embodiments, the titanium dioxide abrasive (e.g., the rutile titanium dioxide abrasive) can comprise additional polymorphs (i.e., other than rutile and anatase) present in an amount of less than 5%, e.g., less than 2.5%, less than 1%, less than 0.5%, less than 0.1%, or less than 0.01%. In certain embodiments, the titanium dioxide abrasive does not contain any detectable amounts of additional polymorphs (i.e., other than rutile and anatase).

Desirably, the rutile titanium dioxide abrasive is pure titanium dioxide or substantially pure titanium dioxide; however, minor amounts of impurities and dopants may be present in the rutile titanium dioxide abrasive. In some embodiments, the titanium dioxide is prepared using methods employing dopants such as tin compounds in order to influence the ratio of rutile to anatase in the titanium dioxide. Accordingly, the abrasive may contain small amounts (e.g., about 5 wt. % or less, about 4 wt. % or less, about 2 wt. % or less, or about 1 wt. % or less) of materials other than titanium dioxide per se.

The rutile titanium dioxide abrasive can be modified (e.g., surface modified) or unmodified. For example, the rutile titanium dioxide abrasive can be surface-modified with polyethylene glycol, silane, or a combination thereof. Suitable polyethylene glycol-based compounds and silane-based compounds for modifying the rutile titanium dioxide abrasive will be readily apparent to a person of ordinary skill in the art. In some embodiments, the rutile titanium dioxide abrasive is surface-modified with a combination of polyethylene glycol and silane. For example, the surface of the rutile titanium dioxide abrasive can be modified with a compound of the formula:

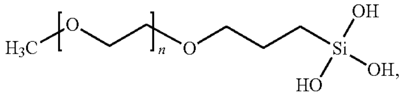

wherein n is an integer from about 2 to about 100, for example, about 2 to about 50, about 2 to about 25, or about 2 to about 20. In some embodiments, the rutile titanium dioxide abrasive has limited or no surface modification. Without wishing to be bound by any particular theory, it is believed that rutile $TiO_2$ abrasive that has undergone too much surface modification may not have an adequate about of rutile $TiO_2$ present at the surface of the abrasive, such that the resulting polishing rate of nickel is reduced.

The rutile titanium dioxide abrasive particles can have any suitable average particle size (i.e., average particle diameter). If the average abrasive particle size is too small, the polishing composition may not exhibit sufficient removal rate. In contrast, if the average abrasive particle size is too large, the polishing composition may exhibit undesirable polishing performance such as, for example, poor substrate defectivity.

Accordingly, the rutile titanium dioxide abrasive particles can have an average particle size of about 20 nm or more, for example, about 25 nm or more, about 30 nm or more, about 35 nm or more, about 40 nm or more, about 45 nm or more, or about 50 nm or more. Alternatively, or in addition, the rutile titanium dioxide abrasive particles can have an average particle size of about 250 nm or less, for example, about 225 nm or less, about 200 nm or less, about 175 nm or less, about 150 nm or less, about 125 nm or less, about 100 nm or less, about 75 nm or less, or about 50 nm or less. Thus, the rutile titanium dioxide abrasive particles can have an average particle size bounded by any two of the aforementioned endpoints.

For example, the rutile titanium dioxide abrasive particles can have an average particle size of about 20 nm to about 250 nm, about 20 nm to about 225 nm, about 20 nm to about 200 nm, about 20 nm to about 175 nm, about 20 nm to about 150 nm, about 20 nm to about 125 nm, about 20 nm to about 100 nm, about 30 nm to about 250 nm, about 30 nm to about 225 nm, about 30 nm to about 200 nm, about 30 nm to about 175 nm, about 30 nm to about 150 nm, about 30 nm to about 125 nm, about 30 nm to about 100 nm, about 40 nm to about 250 nm, about 40 nm to about 225 nm, about 40 nm to about 200 nm, about 40 nm to about 175 nm, about 40 nm to about 150 nm, about 40 nm to about 125 nm, about 40 nm to about 100 nm, about 50 nm to about 250 nm, about 50 nm to about 225 nm, about 50 nm to about 200 nm, about 50 nm to about 175 nm, about 50 nm to about 150 nm, about 50 nm to about 125 nm, or about 50 nm to about 100 nm. For non-spherical abrasive particles, the size of the particle is the diameter of the smallest sphere that encompasses the particle. The particle size of the abrasive can be measured using any suitable technique, for example, using laser diffraction techniques. Suitable particle size measurement instruments are available from e.g., Malvern Instruments (Malvern, UK). In this regard, the average particle size recited herein refers to the average particle size of all titanium dioxide particles present in the polishing composition. Although the average particle sizes of the population of rutile particles and the population of anatase particles present in the polishing composition will typically not be equal, preferably, the average particle sizes of the populations of rutile particles and anatase particles are separately, as well as together, within the ranges recited herein.

The rutile titanium dioxide abrasive can be present in the polishing composition in any suitable amount. If the polishing composition of the invention comprises too little abrasive, the composition may not exhibit sufficient removal rate. In contrast, if the polishing composition comprises too much abrasive, then the polishing composition may exhibit undesirable polishing performance and/or may not be cost effective and/or may lack stability. The polishing composition can comprise about 10 wt. % or less of the rutile titanium dioxide abrasive, for example, about 9 wt. % or less, about 8 wt. % or less, about 7 wt. % or less, about 6 wt. % or less, about 5 wt. % or less, about 4 wt. % or less, about 3 wt. % or less, about 2 wt. % or less, about 1 wt. % or less, about 0.9 wt. % or less, about 0.8 wt. % or less, about 0.7 wt. % or less, about 0.6 wt. % or less, or about 0.5 wt. % or less of the rutile titanium dioxide abrasive. Alternatively, or in addition, the polishing composition can comprise about 0.001 wt. % or more of the rutile titanium dioxide abrasive, for example, about 0.005 wt. % or more, about 0.01 wt. % or more, about 0.05 wt. % or more, about 0.1 wt. % or more, about 0.2 wt. % or more, about 0.3 wt. % or more, about 0.4 wt. % or more, about 0.5 wt. % or more, or about 1 wt. % or more of the rutile titanium dioxide abrasive. Thus, the polishing composition can comprise the rutile titanium dioxide abrasive in an amount bounded by any two of the aforementioned endpoints, as appropriate.

For example, in some embodiments, the rutile titanium dioxide abrasive can be present in the polishing composition in an amount of about 0.001 wt. % to about 10 wt. % of the polishing composition, e.g., about 0.001 wt. % to about 8 wt. %, about 0.001 wt. % to about 6 wt. %, about 0.001 wt. % to about 5 wt. %, about 0.001 wt. % to about 4 wt. %, about 0.001 wt. % to about 2 wt. %, about 0.001 wt. % to about 1 wt. %, about 0.01 wt. % to about 10 wt. %, about 0.01 wt. % to about 8 wt. %, about 0.01 wt. % to about 6 wt. %, about 0.01 wt. % to about 5 wt. %, about 0.01 wt. % to about 4 wt. %, about 0.01 wt. % to about 2 wt. %, about 0.01 wt. % to about 1 wt. %, about 0.05 wt. % to about 10 wt. %, about 0.05 wt. % to about 8 wt. %, about 0.05 wt. % to about 6 wt. %, about 0.05 wt. % to about 5 wt. %, about 0.05 wt. % to about 4 wt. %, about 0.05 wt. % to about 2 wt. %, about 0.05 wt. % to about 1 wt. %, about 0.1 wt. % to about 10 wt. %, about 0.1 wt. % to about 8 wt. %, about 0.1 wt. % to about 6 wt. %, about 0.1 wt. % to about 5 wt. %, about 0.1 wt. % to about 4 wt. %, about 0.1 wt. % to about 2 wt. %, about 0.1 wt. % to about 1 wt. %, about 0.5 wt. % to about 10 wt. %, about 0.5 wt. % to about 8 wt. %, about 0.5 wt. % to about 5 wt. %, about 0.5 wt. % to about 4 wt. %, about 0.5 wt. % to about 2 wt. %, about 0.5 wt. % to about 1 wt. %, about 1 wt. % to about 10 wt. %, about 1 wt. % to about 8 wt. %, about 1 wt. % to about 6 wt. %, about 1 wt. % to about 5 wt. %, about 1 wt. % to about 4 wt. %, or about 1 wt. % to about 2 wt. %. In some embodiments, the polishing composition comprises about 0.001 wt. % to about 10 wt. % of the rutile titanium dioxide abrasive. In certain embodiments, the polishing composition comprises about 0.05 wt. % to about 5 wt. % of the rutile titanium dioxide abrasive.

The polishing composition comprises an organic polishing promoter comprising a carboxylic acid, a urea, an amine, a thiol, a hydroxyl, an amide, a sulfonic acid, salts thereof, or combinations thereof. The organic polishing promoter can be any suitable small molecule comprising one or more chemical moieties selected from a carboxylic acid, a urea, an amine, a thiol, a hydroxyl, an amide, a sulfonic acid, and salts thereof. In some embodiments, the organic polishing promoter comprises an amine (e.g., one amine, two amines, three amines, four amines, or five amines). The amine can be a primary amine, a secondary amine, a tertiary amine, or a combination thereof. In certain embodiments, the organic polishing promoter comprises (i) an amine (e.g., one amine, two amines, three amines, four amines, or five amines) and (ii) a thiol (e.g., one thiol, two thiols, three thiols, four thiols, or five thiols) and/or a hydroxyl (e.g., one hydroxyl, two hydroxyls, three hydroxyls, four hydroxyls, or five hydroxyls). For example, the organic polishing promoter can comprise (i) an amine and a thiol, (ii) an amine and a hydroxyl, or (iii) an amine, a thiol, and a hydroxyl. In other embodiments, the organic polishing promoter comprises a thiol (e.g., one thiol, two thiols, three thiols, four thiols, or five thiols). In some embodiments, the organic polishing promoter does not contain phosphorus.

In some embodiments, the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof. In certain embodiments, the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, ethanolamine, L-cysteine, salts thereof, and combinations thereof. In preferred embodiments, the organic polishing promoter is selected from 2-amino-2-(hydroxymethyl)propane-1,3-diol, 2-aminoethanethiol, L-cysteine, salts thereof, and combinations thereof.

The polishing composition can comprise any suitable amount of the organic polishing promoter. The polishing composition can comprise about 10 ppm or more of the organic polishing promoter, for example, about 25 ppm or more, about 50 ppm or more, or about 100 ppm or more of the organic polishing promoter. Alternatively, or in addition, the polishing composition can comprise about 10,000 ppm or less of the organic polishing promoter, for example, about 5,000 ppm or less, about 2,000 ppm or less, about 1,000 ppm or less, or about 500 ppm or less of the organic polishing promoter. Thus, the polishing composition can comprise the organic polishing promoter in an amount bounded by any two of the aforementioned endpoints, as appropriate.

For example, the organic polishing promoter can be present in the polishing composition in an amount of about 10 ppm to about 10,000 ppm, about 10 ppm to about 5,000 ppm, about 10 ppm to about 2,000 ppm, about 10 ppm to about 1,000 ppm, about 10 ppm to about 500 ppm, about 25 ppm to about 10,000 ppm, about 25 ppm to about 5,000 ppm, about 25 ppm to about 2,000 ppm, about 25 ppm to about 1,000 ppm, about 25 ppm to about 500 ppm, about 50 ppm to about 10,000 ppm, about 50 ppm to about 5,000 ppm, about 50 ppm to about 2,000 ppm, about 50 ppm to about 1,000 ppm, about 50 ppm to about 500 ppm, about 100 ppm to about 10,000 ppm, about 100 ppm to about 5,000 ppm, about 100 ppm to about 2,000 ppm, about 100 ppm to about 1,000 ppm, or about 100 ppm to about 500 ppm. In some embodiments, the polishing composition comprises about 10 ppm to about 10,000 ppm of the organic polishing promoter. In certain embodiments, the polishing composition comprises about 50 ppm to about 1,000 ppm of the organic polishing promoter.

In some embodiments, the chemical-mechanical polishing composition further comprises an oxidizing agent. The oxidizing agent can be any suitable compound capable of oxidizing a substrate (e.g., nickel). For example, the oxidizing agent can be selected from oxone, cerium ammonium nitrate, a peroxide (e.g., hydrogen peroxide), a periodate (e.g., sodium periodate or potassium periodate), an iodate (e.g., sodium iodate, potassium iodate, or ammonium iodate), a persulfate (e.g., sodium persulfate, potassium persulfate, or ammonium persulfate), a chlorate (e.g., sodium chlorate or potassium chlorate), a chromate (e.g., sodium chromate or potassium chromate), a permanganate (e.g., sodium permanganate, potassium permanganate, or ammonium permanganate), a bromate (e.g., sodium bromate or potassium bromate), a perbromate (e.g., sodium perbromate or potassium perbromate), a ferrate (e.g., potassium ferrate), a perrhenate (e.g., ammonium perrhenate), a perruthenate (e.g., tetrapropylammonium perruthenate), and a combination thereof. The oxidizing agent can be in acid form (e.g., persulfuric acid), salt form (e.g., ammonium persulfate), or a mixture thereof. In some embodiments, the oxidizing agent comprises the alkali metal (e.g., sodium or potassium) salt of a peroxide, a periodate, an iodate, a persulfate, a chlorate, a chromate, a permanganate, a bromate, a perbromate, a ferrate, a perrhenate, a perruthenate, or combinations thereof.

In certain embodiments, the oxidizing agent is selected from a peroxide (e.g., hydrogen peroxide), a permanganate (e.g., sodium permanganate, potassium permanganate, or ammonium permanganate), cerium ammonium nitrate, and combinations thereof. In some embodiments, the oxidizing agent is cerium ammonium nitrate. In other embodiments, the oxidizing agent is a permanganate (e.g., sodium permanganate, potassium permanganate, or ammonium permanganate) such as potassium permanganate. In some embodiments, the oxidizing agent is a peroxide (e.g., hydrogen peroxide). In certain embodiments, the oxidizing agent is hydrogen peroxide.

In embodiments where the polishing composition includes an oxidizing agent, the polishing composition can comprise any suitable amount of the oxidizing agent. The polishing composition can comprise about 20 wt. % or less of the oxidizing agent, for example, about 15 wt. % or less, about 10 wt. % or less, about 9 wt. % or less, about 8 wt. % or less, about 7 wt. % or less, about 6 wt. % or less, about 5 wt. % or less, about 4 wt. % or less, about 3 wt. % or less, or about 2 wt. % or less of the oxidizing agent. Alternatively, or in addition, the polishing composition can comprise about 0.1 wt. % or more of the oxidizing agent, for example, about 0.5 wt. % or more, about 1 wt. % or more, about 2 wt. % or more, about 3 wt. % or more, about 4 wt. % or more, or about 5 wt. % or more of the oxidizing agent. Thus, the polishing composition can comprise the oxidizing agent in an amount bounded by any two of the aforementioned endpoints, as appropriate.

For example, in some embodiments, the oxidizing agent, when present, can be present in the polishing composition in an amount of about 0.1 wt. % to about 20 wt. %, e.g., about 0.1 wt. % to about 15 wt. %, about 0.1 wt. % to about 10 wt. %, about 0.1 wt. % to about 9 wt. %, about 0.1 wt. % to about 8 wt. %, about 0.1 wt. % to about 7 wt. %, about 0.1 wt. % to about 6 wt. %, about 0.1 wt. % to about 5 wt. %, about 0.1 wt. % to about 4 wt. %, about 0.1 wt. % to about 3 wt. %, about 0.1 wt. % to about 2 wt. %, about 0.5 wt. % to about 20 wt. %, about 0.5 wt. % to about 15 wt. %, about 0.5 wt. % to about 10 wt. %, about 0.5 wt. % to about 9 wt. %, about 0.5 wt. % to about 8 wt. %, about 0.5 wt. % to about 7 wt. %, about 0.5 wt. % to about 6 wt. %, about 0.5 wt. % to about 5 wt. %, about 0.5 wt. % to about 4 wt. %, about 0.5 wt. % to about 3 wt. %, about 0.5 wt. % to about 2 wt. %, about 1 wt. % to about 20 wt. %, about 1 wt. % to about 15 wt. %, about 1 wt. % to about 10 wt. %, about 1 wt. % to about 9 wt. %, about 1 wt. % to about 8 wt. %, about 1 wt. % to about 7 wt. %, about 1 wt. % to about 6 wt. %, about 1 wt. % to about 5 wt. %, about 1 wt. % to about 4 wt. %, about 1 wt. % to about 3 wt. %, about 1 wt. % to about 2 wt. %, about 2 wt. % to about 20 wt. %, about 2 wt. % to about 15 wt. %, about 2 wt. % to about 10 wt. %, about 2 wt. % to about 9 wt. %, about 2 wt. % to about 8 wt. %, about 2 wt. % to about 7 wt. %, about 2 wt. % to about 6 wt. %, about 2 wt. % to about 5 wt. %, about 2 wt. % to about 4 wt. %, about 2 wt. % to about 3 wt. %, about 3 wt. % to about 20 wt. %, about 3 wt. % to about 15 wt. %, about 3 wt. % to about 10 wt. %, about 3 wt. % to about 9 wt. %, about 3 wt. % to about 8 wt. %, about 3 wt. % to about 7 wt. %, about 3 wt. % to about 6 wt. %, about 3 wt. % to about 5 wt. %, or about 3 wt. % to about 4 wt. %.

In some embodiments, the polishing composition further comprises a nickel complexing agent. The nickel complexing agent can comprise any suitable compound capable of complexing (e.g., scavenging) nickel. For example, the nickel complexing agent can comprise one or more of an organic monocarboxylic acid, an organic bicarboxylic acid, an amino carboxylic acid, or any salt thereof. In some embodiments, the nickel complexing agent comprises one or more of a hydroxy multicarboxylic acid such as hydroxyethyl ethylenediamine triacetic acid (HEDTA or HEDTA-H3), glycine, oxime- and/or dioxime-Ni complexer, such as dimethylglyoxime, or any salt thereof. In some embodiments, the nickel complexing agent consists of HEDTA alone or in combination with glycine. In other embodiments, the nickel complexing agent is a compound having at least one hydroxyl functional group and at least two carboxyl or phosphonic acid functional groups.

The nickel complexing agent, when present, can be present in any suitable amount. In some embodiments, the nickel complexing agent can be present in an amount of about 0.01 wt. % to about 10 wt. %. For example, in some embodiments, the nickel complexing agent is present in an amount of about 0.01 wt. % to about 7 wt. %, about 0.01 wt. % to about 5 wt. %, about 0.01 wt. % to about 3 wt. %, about 0.01 wt. % to about 1 wt. %, about 0.01 wt. % to about 0.5 wt. %, about 0.1 wt. % to about 10 wt. %, about 0.1 wt. % to about 7 wt. %, about 0.1 wt. % to about 5 wt. %, about 0.1 wt. % to about 3 wt. %, about 0.1 wt. % to about 1 wt. %, about 0.1 wt. % to about 0.5 wt. %, about 1 wt. % to about 10 wt. %, about 1 wt. % to about 7 wt. % about 1 wt. % to about 5 wt. %, or about 1 wt. % to about 3 wt. %.

The polishing composition comprises water. The water can be any suitable water and can be, for example, deionized water or distilled water. In some embodiments, the polishing composition can further comprise one or more organic solvents in combination with the water. For example, the polishing composition can further comprise a hydroxylic solvent such as methanol or ethanol, a ketonic solvent, an amide solvent, a sulfoxide solvent, or the like.

The chemical-mechanical polishing composition has a pH of about 5 to about 12. In some embodiments, the polishing composition has a pH of about 12 or less, e.g., about 11.5 or less, about 11 or less, about 10.5 or less, about 10 or less, about 9.5 or less, about 9 or less, about 8.5 or less, or about 8 or less. Alternatively, or in addition, the polishing composition can have a pH of about 5 or more, e.g., about 6 or more, about 7 or more, or about 8 or more. Thus, the polishing composition can have a pH bounded by any two of the aforementioned endpoints. For example, the polishing composition can have a pH of about 5 to about 12, e.g., about 5 to about 11.5, about 5 to about 11, about 5 to about 10.5, about 5 to about 10, about 5 to about 9.5, about 5 to about 9, about 5 to about 8.5, about 5 to about 8, about 6 to about 10, about 6 to about 9.5, about 6 to about 9, about 6 to about 8.5, or about 6 to about 8. In some embodiments, the polishing composition has a pH of about 5 to about 9. In certain embodiments, the polishing composition has a pH of about 6 to about 8.

The pH of the polishing composition can be adjusted using any suitable acid or base. Non-limiting examples of suitable acids include nitric acid, sulfuric acid, phosphoric acid, and organic acids such as formic acid and acetic acid. Non-limiting examples of suitable bases include sodium hydroxide, potassium hydroxide, and ammonium hydroxide.

In some embodiments, the polishing composition further comprises a buffering agent. The buffering agent can be any suitable compound capable of buffering (e.g., maintaining) the polishing composition at a particular pH range. For example, the buffering agent can be selected from an ammonium salt, an alkali metal salt, an alkali metal hydroxide, an alkali metal carbonate, an alkali metal bicarbonate, a borate, an amino acid, and combinations thereof.

The chemical-mechanical polishing composition optionally further comprises one or more additives. Illustrative additives include conditioners, acids (e.g., sulfonic acids), complexing agents, chelating agents, biocides, scale inhibitors, and dispersants.

In some embodiments, the polishing composition further comprises a biocide. A non-limiting example of a suitable biocide is an isothiazolinone based biocide such as Kordek MLX™ (DuPont, Wilmington, DE). The polishing composition can comprise any suitable amount of the biocide. For example, the polishing composition can comprise about 0.001 wt. % to about 0.2 wt. % of the biocide.

In embodiments, the invention provides a chemical-mechanical polishing composition comprising, consisting essentially of, or consisting of: (a) a rutile titanium dioxide abrasive; (b) an organic polishing promoter selected from 2-amino-2-methyl-1-propanol, 2-[bis(2-hydroxyethyl) amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; and (c) water, wherein the chemical-mechanical polishing composition has a pH of about 5 to about 12.

In embodiments, the invention provides a chemical-mechanical polishing composition comprising, consisting essentially of, or consisting of: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; (c) an oxidizing agent, and (d) water, wherein the chemical-mechanical polishing composition has a pH of about 5 to about 12.

In embodiments, the invention provides a chemical-mechanical polishing composition comprising, consisting essentially of, or consisting of: (a) a rutile titanium dioxide abrasive; (b) an organic polishing promoter selected from 2-amino-2-methyl-1-propanol, 2-[bis(2-hydroxyethyl) amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; (c) an oxidizing agent selected from oxone, cerium ammonium nitrate, a peroxide (e.g., hydrogen peroxide), a periodate, an iodate, a persulfate, a chlorate, a chromate, a permanganate, a bromate, a perbromate, a ferrate, a perrhenate, a perruthenate, and combinations thereof, and (d) water, wherein the chemical-mechanical polishing composition has a pH of about 5 to about 12.

In embodiments, the invention provides a chemical-mechanical polishing composition comprising, consisting essentially of, or consisting of: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; (c) a peroxide (e.g., hydrogen peroxide), and (d) water, wherein the chemical-mechanical polishing composition has a pH of about 5 to about 12.

In embodiments, the invention provides a chemical-mechanical polishing composition comprising, consisting essentially of, or consisting of: (a) a rutile titanium dioxide abrasive; (b) an organic polishing promoter selected from 2-amino-2-methyl-1-propanol, 2-[bis(2-hydroxyethyl) amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; (c) a peroxide (e.g., hydrogen peroxide), and (d) water, wherein the chemical-mechanical polishing composition has a pH of about 5 to about 12.

The polishing composition can be produced by any suitable technique, many of which are known to those skilled in the art. The polishing composition can be prepared in a batch or continuous process. Generally, the polishing composition is prepared by combining the components of the polishing composition. The term "component" as used herein includes individual ingredients (e.g., rutile titanium dioxide abrasive, organic polishing promoter, optional oxidizing agent, optional nickel complexing agent, optional pH adjustor, and/or any optional additive) as well as any combination of ingredients (e.g., rutile titanium dioxide abrasive, organic polishing promoter, optional oxidizing agent, optional nickel complexing agent, optional pH adjustor, and/or any optional additive, etc.).

For example, the polishing composition can be prepared by (i) providing all or a portion of the liquid carrier, (ii) dispersing the rutile titanium dioxide abrasive, organic polishing promoter, optional oxidizing agent, optional nickel complexing agent, and/or any optional additive, using any suitable means for preparing such a dispersion, (iii) adjusting the pH of the dispersion as appropriate, and (iv) optionally adding suitable amounts of any other optional components and/or additives to the mixture.

Alternatively, the polishing composition can be prepared by (i) providing one or more components (e.g., organic polishing promoter, optional oxidizing agent, optional nickel complexing agent, optional pH adjustor, and/or any optional additive) in an abrasive slurry (e.g., a rutile titanium dioxide abrasive slurry), (ii) providing one or more components in an additive solution (e.g., organic polishing promoter, optional oxidizing agent, optional nickel complexing agent, and/or any optional additive), (iii) combining the abrasive slurry (e.g., the rutile titanium dioxide abrasive slurry) and the additive solution to form a mixture, (iv) optionally adding suitable amounts of any other optional additives to the mixture, and (v) adjusting the pH of the mixture as appropriate.

The polishing composition can be supplied as a one-package system comprising the rutile titanium dioxide abrasive, organic polishing promoter, optional oxidizing agent, optional nickel complexing agent, optional pH adjustor, and/or any optional additive, and water. Alternatively, the polishing composition of the invention can be supplied as a two-package system comprising the rutile titanium dioxide abrasive in a first package and an additive solution in a second package, wherein the rutile titanium dioxide abrasive slurry consists essentially of, or consists of, a rutile titanium dioxide abrasive and water, and wherein the additive solution consists essentially of, or consists of, organic polishing promoter, optional oxidizing agent, optional nickel complexing agent, optional pH adjustor, and/or any optional additive. The two-package system allows for the adjustment of polishing composition characteristics by changing the blending ratio of the two packages, i.e., the rutile titanium dioxide abrasive slurry and the additive solution.

Various methods can be employed to utilize such a two-package polishing system. For example, the rutile titanium dioxide abrasive slurry and additive solution can be delivered to the polishing table by different pipes that are joined and connected at the outlet of supply piping. The rutile titanium dioxide abrasive slurry and additive solution can be mixed shortly or immediately before polishing, or can be supplied simultaneously on the polishing table. Furthermore, when mixing the two packages, deionized water can be added, as desired, to adjust the polishing composition and resulting substrate polishing characteristics.

Similarly, a three-, four-, or more package system can be utilized in connection with the invention, wherein each of multiple containers contains different components of the inventive chemical-mechanical polishing composition, one or more optional components, and/or one or more of the same components in different concentrations.

In order to mix components contained in two or more storage devices to produce the polishing composition at or near the point-of-use, the storage devices typically are provided with one or more flow lines leading from each storage device to the point-of-use of the polishing composition (e.g., the platen, the polishing pad, or the substrate surface). As utilized herein, the term "point-of-use" refers to the point at which the polishing composition is applied to the substrate surface (e.g., the polishing pad or the substrate surface itself). By the term "flow line" is meant a path of flow from an individual storage container to the point-of-use of the component stored therein. The flow lines can each lead directly to the point-of-use, or two or more of the flow lines can be combined at any point into a single flow line that leads to the point-of-use. Furthermore, any of the flow lines (e.g., the individual flow lines or a combined flow line) can first lead to one or more other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or one or more of the components can be combined before delivery to the point-of-use, e.g., shortly or immediately before delivery to the point-of-use. Components are combined "immediately before delivery to the point-of-use" if the components are combined about 5 minutes or less prior to being added in mixed form onto the platen, for example, about 4 minutes or less, about 3 minutes or less, about 2 minutes or less, about 1 minute or less, about 45 seconds or less, about 30 seconds or less, about 10 seconds or less prior to being added in mixed form onto the platen, or simultaneously to the delivery of the components at the point-of-use (e.g., the components are combined at a dispenser). Components also are combined "immediately before delivery to the point-of-use" if the components are combined within 5 m of the point-of-use, such as within 1 m of the point-of-use or even within 10 cm of the point-of-use (e.g., within 1 cm of the point-of-use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing slurry are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

The polishing composition also can be provided as a concentrate which is intended to be diluted with an appropriate amount of water prior to use. In such an embodiment, the polishing composition concentrate comprises the components of the polishing composition in amounts such that, upon dilution of the concentrate with an appropriate amount of water, each component of the polishing composition will be present in the polishing composition in an amount within the appropriate range recited above for each component. For example, the rutile titanium dioxide abrasive, organic polishing promoter, optional oxidizing agent, optional nickel complexing agent, optional pH adjustor, and/or any optional additive can each be present in the concentrate in an amount that is about 2 times (e.g., about 3 times, about 4 times, or about 5 times) greater than the concentration recited above for each component so that, when the concentrate is diluted with an equal volume of water (e.g., 2 equal volumes water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that t the rutile titanium dioxide abrasive, organic polishing promoter, optional oxidizing agent, optional nickel complexing agent, optional pH adjustor, and/or any optional additive are at least partially or fully dissolved in the concentrate.

The invention also provides a method of chemically-mechanically polishing a substrate comprising: (i) providing a substrate comprising nickel on a surface of the substrate, (ii) providing a polishing pad, (iii) providing a chemical-mechanical polishing composition comprising a rutile titanium dioxide abrasive, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

The invention further provides a method of chemically-mechanically polishing a substrate comprising: (i) providing a substrate comprising nickel on a surface of the substrate, (ii) providing a polishing pad, (iii) providing a chemical-mechanical polishing composition comprising: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

The chemical-mechanical polishing composition can be used to polish any suitable substrate and is especially useful for polishing substrates comprising at least one layer (typically a surface layer) comprising nickel. The nickel can be any suitable form of nickel, including, for example, elemental nickel, nickel oxide, and nickel hydroxide. Without wishing to be bound by any particular theory, it is believed that elemental nickel may be oxidized to nickel oxide or nickel hydroxide prior to removal. Suitable substrates include wafers used in the semiconductor industry. The wafers typically comprise or consist of, for example, a metal, metal oxide, metal nitride, metal composite, metal alloy, a low dielectric material, or combinations thereof. In a preferred embodiment, the substrate comprises nickel (e.g., a nickel layer) on a surface of the substrate, wherein at least a portion of the nickel (e.g., a nickel layer) on the surface of the substrate is abraded to polish the substrate.

The method of the invention is particularly useful for polishing substrates comprising nickel and optionally a silicon nitride layer on a surface of the substrate, a silicon oxide layer on a surface of the substrate, or a titanium nitride layer on a surface of the substrate, e.g., any one, two, or all three of the aforementioned materials in addition to nickel. For example, the method may include a substrate comprising (i) a silicon nitride layer on a surface of the substrate, and wherein at least a portion of the silicon nitride layer on the surface of the substrate is abraded at a silicon nitride removal rate to polish the substrate, (ii) a silicon oxide layer on a surface of the substrate, and wherein at least a portion of the silicon oxide layer on the surface of the substrate is abraded at a silicon oxide removal rate to polish the substrate, and/or (iii) a titanium nitride layer on a surface of the substrate, and wherein at least a portion of the titanium nitride layer on the surface of the substrate is abraded at a titanium nitride removal rate to polish the substrate. In certain embodiments, the substrate comprises a nickel layer on a surface of the substrate in combination with a silicon oxide layer, a silicon nitride layer, and/or a titanium nitride layer on the surface of the substrate.

The polishing composition of the invention desirably exhibits a high removal rate when polishing a substrate comprising nickel according to a method of the invention. For example, when polishing silicon wafers comprising a nickel layer in accordance with an embodiment of the invention, the polishing composition desirably exhibits a removal rate of the nickel of about 400 Å/min or higher, e.g., about 450 Å/min or higher, about 500 Å/min or higher, about 550 Å/min or higher, about 600 Å/min or higher, about 650 Å/min or higher, about 700 Å/min or higher, about 750 Å/min or higher, about 800 Å/min or higher, about 850 Å/min or higher, about 900 Å/min or higher, about 950 Å/min or higher, about 1000 Å/min or higher, about 1100 Å/min or higher, about 1200 Å/min or higher, about 1300 Å/min or higher, about 1400 Å/min or higher, about 1500 Å/min or higher, about 1600 Å/min or higher, about 1700 Å/min or higher, about 1800 Å/min or higher, about 1900 Å/min or higher, about 2000 Å/min or higher, about 2100 Å/min or higher, about 2200 Å/min or higher, about 2300 Å/min or higher, about 2400 Å/min or higher, about 2500 Å/min or higher, about 2600 Å/min or higher, about 2700

Å/min or higher, about 2800 Å/min or higher, about 2900 Å/min or higher, or about 3000 Å/min or higher.

In some embodiments, where the substrate further comprises silicon oxide, the silicon oxide can be any suitable silicon oxide, many of which are known in the art. Suitable types of silicon oxide include but are not limited to borophosphosilicate glass (BPSG), tetraethyl orthosilicate (TEOS), plasma enhanced tetraethylorthosilicate (PETEOS), thermal oxide, undoped silicate glass, and high density plasma (HDP) oxide. The chemical-mechanical polishing composition of the invention desirably exhibits a low removal rate of silicon oxide when polishing a substrate comprising silicon oxide according to a method of the invention. For example, when polishing substrates comprising silicon oxide in accordance with an embodiment of the invention, the polishing composition desirably exhibits a removal rate of silicon oxide of about 500 Å/min or lower, e.g., about 250 Å/min or lower, about 200 Å/min or lower, about 150 Å/min or lower, about 100 Å/min or lower, about 50 Å/min or lower, about 25 Å/min or lower, about 10 Å/min or lower, or about 5 Å/min or lower. In some embodiments, the polishing composition exhibits a silicon oxide removal rate that is too low to be detected. In certain embodiments, the polishing composition does not remove any silicon oxide (i.e., a removal rate of 0 Å/min).

In some embodiments, where the substrate further comprises silicon nitride, the silicon nitride can be any suitable silicon nitride, many of which are known in the art. The chemical-mechanical polishing composition of the invention desirably exhibits a low removal rate of silicon nitride when polishing a substrate comprising silicon nitride according to a method of the invention. For example, when polishing substrates comprising silicon nitride in accordance with an embodiment of the invention, the polishing composition desirably exhibits a removal rate of silicon nitride of about 500 Å/min or lower, e.g., about 250 Å/min or lower, about 200 Å/min or lower, about 150 Å/min or lower, about 100 Å/min or lower, about 50 Å/min or lower, about 25 Å/min or lower, about 10 Å/min or lower, or about 5 Å/min or lower. In some embodiments, the polishing composition exhibits a silicon nitride removal rate that is too low to be detected. In certain embodiments, the polishing composition does not remove any silicon nitride (i.e., a removal rate of 0 Å/min).

In some embodiments, where the substrate further comprises titanium nitride, the titanium nitride can be any suitable titanium nitride, many of which are known in the art. The chemical-mechanical polishing composition of the invention desirably exhibits a low removal rate of titanium nitride when polishing a substrate comprising titanium nitride according to a method of the invention. For example, when polishing substrates comprising titanium nitride in accordance with an embodiment of the invention, the polishing composition desirably exhibits a removal rate of titanium nitride of about 500 Å/min or lower, e.g., about 250 Å/min or lower, about 200 Å/min or lower, about 150 Å/min or lower, about 100 Å/min or lower, about 50 Å/min or lower, about 25 Å/min or lower, about 10 Å/min or lower, or about 5 Å/min or lower. In some embodiments, the polishing composition exhibits a titanium nitride removal rate that is too low to be detected. In certain embodiments, the polishing composition does not remove any titanium nitride (i.e., a removal rate of 0 Å/min).

The chemical-mechanical polishing composition of the invention can be tailored to provide effective polishing at the desired polishing ranges selective to specific thin layer materials, while at the same time minimizing surface imperfections, defects, corrosion, erosion, and the removal of stop layers. The selectivity can be controlled, to some extent, by altering the relative concentrations of the components of the polishing composition. When desirable, the chemical-mechanical polishing composition of the invention can be used to polish a substrate comprising nickel and silicon oxide on a layer of the surface of the substrate, wherein the chemical-mechanical polishing composition provides a nickel to silicon oxide polishing selectivity of about 5:1 or higher (e.g., about 10:1 or higher, about 15:1 or higher, about 25:1 or higher, about 50:1 or higher, about 100:1 or higher, or about 150:1 or higher). Also, the chemical-mechanical polishing composition of the invention can be used to polish a substrate comprising nickel and silicon nitride on a layer of the surface of the substrate, wherein the chemical-mechanical polishing composition provides a nickel to silicon nitride polishing selectivity of about 5:1 or higher (e.g., about 10:1 or higher, about 15:1 or higher, about 25:1 or higher, about 50:1 or higher, about 100:1 or higher, or about 150:1 or higher). In addition, the chemical-mechanical polishing composition of the invention can be used to polish a substrate comprising nickel and titanium nitride on a layer of the surface, wherein the chemical-mechanical polishing composition provides a nickel to titanium nitride polishing selectivity of about 5:1 or higher (e.g., about 10:1 or higher, about 15:1 or higher, about 25:1 or higher, about 50:1 or higher, about 100:1 or higher, or about 150:1 or higher). Thus, in embodiments, when used to polish substrates comprising at least one layer of nickel, and at least one layer of silicon oxide, at least one layer of silicon nitride, and/or at least one layer of titanium nitride, the polishing composition and polishing method allow for the preferential removal of nickel as compared with the removal of silicon oxide, silicon nitride, and/or titanium nitride. As used herein, the phrase "polishing selectivity" refers to the ratio of the removal rates of two different thin layer materials.

The polishing composition of the invention desirably exhibits low particle defects when polishing a substrate, as determined by suitable techniques. Particle defects on a substrate polished with the inventive polishing composition can be determined by any suitable technique. For example, laser light scattering techniques, such as dark field normal beam composite (DCN) and dark field oblique beam composite (DCO), can be used to determine particle defects on polished substrates. Suitable instrumentation for evaluating particle defectivity is available from, for example, KLA-Tencor (e.g., SURFSCAN™ SP instruments operating at a 120 nm threshold or at 160 nm threshold).

The chemical-mechanical polishing composition and method of the invention are particularly suited for use in conjunction with a chemical-mechanical polishing apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving the substrate relative to the surface of the polishing pad. The polishing of the substrate takes place by the substrate being placed in contact with the polishing pad and the polishing composition of the invention, and then the polishing pad moving relative to the substrate, so as to abrade at least a portion of the substrate to polish the substrate.

A substrate can be polished with the chemical-mechanical polishing composition using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. Soft polyurethane polishing pads are particularly useful in conjunction with the inventive polishing method. Typical pads include but are not limited to SURFIN™ 000, SURFIN™ SSW1, SPM3100 (commercially available from, for example, Eminess Technologies), POLITEX™, EPIC™ D100 pad (commercially available from CMC Materials), IC1010 pad (commercially available from Dow, Inc.) and Fujibo POLYPAS™ 27.

Desirably, the chemical-mechanical polishing apparatus further comprises an in situ polishing endpoint detection system, many of which are known in the art. Techniques for inspecting and monitoring the polishing process by analyzing light or other radiation reflected from a surface of the substrate being polished are known in the art. Such methods are described, for example, in U.S. Pat. Nos. 5,196,353, 5,433,651, 5,609,511. U.S. Pat. Nos. 5,643,046, 5,658,183, 5,730,642, 5,838,447, 5,872,633. U.S. Pat. Nos. 5,893,796, 5,949,927, and 5,964,643. Desirably, the inspection or monitoring of the progress of the polishing process with respect to a substrate being polished enables the determination of the polishing end-point, i.e., the determination of when to terminate the polishing process with respect to a particular substrate.

In embodiments, the invention provides a method of chemically-mechanically polishing a substrate comprising, consisting essentially of, or consisting of: (a) a rutile titanium dioxide abrasive; (b) an organic polishing promoter selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; and (c) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

In embodiments, the invention provides a method of chemically-mechanically polishing a substrate comprising, consisting essentially of, or consisting of: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; (c) an oxidizing agent, and (d) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

In embodiments, the invention provides a method of chemically-mechanically polishing a substrate comprising, consisting essentially of, or consisting of: (a) a rutile titanium dioxide abrasive; (b) an organic polishing promoter selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; (c) an oxidizing agent selected from oxone, cerium ammonium nitrate, a peroxide (e.g., hydrogen peroxide), a periodate, an iodate, a persulfate, a chlorate, a chromate, a permanganate, a bromate, a perbromate, a ferrate, a perrhenate, a perruthenate, and combinations thereof, and (d) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

In embodiments, the invention provides a method of chemically-mechanically polishing a substrate comprising, consisting essentially of, or consisting of: (a) a rutile titanium dioxide abrasive; (b) an organic polishing promoter comprising a carboxylic acid, a urea, an amine, a thiol, a hydroxyl, an amide, a sulfonic acid, salts thereof, or combinations thereof; (c) a peroxide (e.g., hydrogen peroxide), and (d) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

In embodiments, the invention provides a method of chemically-mechanically polishing a substrate comprising, consisting essentially of, or consisting of: (a) a rutile titanium dioxide abrasive; (b) an organic polishing promoter selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof; (c) a peroxide (e.g., hydrogen peroxide), and (d) water, wherein the chemical-mechanical polishing composition has a pH of about 5 to about 12, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

Aspects, including embodiments, of the invention described herein may be beneficial alone or in combination, with one or more other aspects or embodiments. Without limiting the foregoing description, certain non-limiting embodiments of the disclosure numbered 1-43 are provided below. As will be apparent to those of skill in the art upon reading this disclosure, each of the individually numbered embodiments may be used or combined with any of the preceding or following individually numbered embodiments. This is intended to provide support for all such combinations of embodiments and is not limited to combinations of embodiments explicitly provided below:

EMBODIMENTS (1) In embodiment (1) is presented a chemical-mechanical polishing composition comprising:
(a) a rutile titanium dioxide abrasive;
(b) an organic polishing promoter comprising a carboxylic acid, a urea, an amine, a thiol, a hydroxyl, an amide, a sulfonic acid, salts thereof, or combinations thereof; and
(c) water,
wherein the chemical-mechanical polishing composition has a pH of about 5 to about 12.
(2) In embodiment (2) is presented the polishing composition of embodiment (1), wherein the polishing composition has a pH of about 5 to about 9.
(3) In embodiment (3) is presented the polishing composition of embodiment (1) or embodiment (2), wherein the polishing composition has a pH of about 6 to about 8.
(4) In embodiment (4) is presented the polishing composition of any one of embodiments (1)-(3), wherein the polishing composition comprises about 0.001 wt. % to about 10 wt. % of the rutile titanium dioxide abrasive.
(5) In embodiment (5) is presented the polishing composition of any one of embodiments (1)-(4), wherein the polishing composition comprises about 0.05 wt. % to about 5 wt. % of the rutile titanium dioxide abrasive.
(6) In embodiment (6) is presented the polishing composition of any one of embodiments (1)-(5), wherein the rutile titanium dioxide abrasive is surface-modified with polyethylene glycol, silane, or a combination thereof.
(7) In embodiment (7) is presented the polishing composition of any one of embodiments (1)-(6), wherein the rutile titanium dioxide abrasive is surface-modified with a combination of polyethylene glycol and silane.
(8) In embodiment (8) is presented the polishing composition of any one of embodiments (1)-(7), wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof.
(9) In embodiment (9) is presented the polishing composition of any one of embodiments (1)-(7), wherein the organic polishing promoter comprises (i) an amine and (ii) a thiol and/or a hydroxyl.
(10) In embodiment (10) is presented the polishing composition of embodiment (9), wherein the organic polishing promoter comprises (i) an amine and (ii) a thiol.
(11) In embodiment (11) is presented the polishing composition of embodiment (9), wherein the organic polishing promoter comprises (i) an amine and (ii) a hydroxyl.
(12) In embodiment (12) is presented the polishing composition of embodiment (9), wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, ethanolamine, L-cysteine, salts thereof, and combinations thereof.
(13) In embodiment (13) is presented the polishing composition of any one of embodiments (1)-(12), wherein the polishing composition comprises about 10 ppm to about 10,000 ppm of the organic polishing promoter.
(14) In embodiment (14) is presented the polishing composition of any one of embodiments (1)-(13), wherein the polishing composition comprises about 50 ppm to about 1,000 ppm of the organic polishing promoter.
(15) In embodiment (15) is presented the polishing composition of any one of embodiments (1)-(14), wherein the polishing composition further comprises an oxidizing agent.
(16) In embodiment (16) is presented the polishing composition of any one of embodiments (1)-(15), wherein the oxidizing agent is selected from oxone, cerium ammonium nitrate, a peroxide, a periodate, an iodate, a persulfate, a chlorate, a chromate, a permanganate, a bromate, a perbromate, a ferrate, a perrhenate, a perruthenate, and a combination thereof.
(17) In embodiment (17) is presented a method of chemically-mechanically polishing a substrate comprising:
(i) providing a substrate comprising nickel on a surface of the substrate,
(ii) providing a polishing pad,
(iii) providing a chemical-mechanical polishing composition comprising a rutile titanium dioxide abrasive,
(iv) contacting the substrate with the polishing pad and the chemical-mechanical polishing composition, and
(v) moving the polishing pad and the chemical-mechanical polishing composition relative to the substrate, wherein at least a portion of the nickel on a surface of the substrate is abraded at a nickel removal rate to polish the substrate.
(18) In embodiment (18) is presented the method of embodiment (17), wherein the polishing composition further comprises:
(a) an organic polishing promoter comprising a carboxylic acid, a urea, an amine, a thiol, a hydroxyl, an amide, a sulfonic acid, salts thereof, or combinations thereof; and
(b) water,
wherein the chemical-mechanical polishing composition has a pH of about 5 to about 12.
(19) In embodiment (19) is presented the method of embodiment (17) or embodiment (18), wherein the polishing composition has a pH of about 5 to about 9.
(20) In embodiment (20) is presented the method of any one of embodiments (17)-(19), wherein the polishing composition has a pH of about 6 to about 8.
(21) In embodiment (21) is presented the method of any one of embodiments (17)-(20), wherein the polishing composition comprises about 0.001 wt. % to about 10 wt. % of the rutile titanium dioxide abrasive.
(22) In embodiment (22) is presented the method of any one of embodiments (17)-(21), wherein the polishing composition comprises about 0.05 wt. % to about 5 wt. % of the rutile titanium dioxide abrasive.
(23) In embodiment (23) is presented the method of any one of embodiments (17)-(22), wherein the rutile titanium dioxide abrasive is surface-modified with polyethylene glycol, silane, or a combination thereof.
(24) In embodiment (24) is presented the method of any one of embodiments (17)-(23), wherein the rutile titanium dioxide abrasive is surface-modified with a combination of polyethylene glycol and silane.
(25) In embodiment (25) is presented the method of any one of embodiments (17)-(24), wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof.

(26) In embodiment (26) is presented the method of any one of embodiments (17)-(25), wherein the organic polishing promoter comprises (i) an amine and (ii) a thiol and/or a hydroxyl.

(27) In embodiment (27) is presented the method of embodiment (26), wherein the organic polishing promoter comprises (i) an amine and (ii) a thiol.

(28) In embodiment (28) is presented the method of embodiment (26), wherein the organic polishing promoter comprises (i) an amine and (ii) a hydroxyl.

(29) In embodiment (29) is presented the method of embodiment (26), wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, ethanolamine, L-cysteine, salts thereof, and combinations thereof.

(30) In embodiment (30) is presented the method of any one of embodiments (17)-(29), wherein the polishing composition comprises about 10 ppm to about 10,000 ppm of the organic polishing promoter.

(31) In embodiment (31) is presented the method of any one of embodiments (17)-(30), wherein the polishing composition comprises about 50 ppm to about 1,000 ppm of the organic polishing promoter.

(32) In embodiment (32) is presented the method of any one of embodiments (17)-(31), wherein the polishing composition further comprises an oxidizing agent.

(33) In embodiment (33) is presented the method of any one of embodiments (17)-(32), wherein the oxidizing agent is selected from oxone, cerium ammonium nitrate, a peroxide, a periodate, an iodate, a persulfate, a chlorate, a chromate, a permanganate, a bromate, a perbromate, a ferrate, a perrhenate, a perruthenate, and a combination thereof.

(34) In embodiment (34) is presented the method of any one of embodiments (17)-(33), wherein the nickel removal rate is at least 400 Å/min.

(35) In embodiment (35) is presented the method of any one of embodiments (17)-(34), wherein the nickel removal rate is at least 500 Å/min.

(36) In embodiment (36) is presented the method of any one of embodiments (17)-(35), wherein the nickel removal rate is at least 600 Å/min.

(37) In embodiment (37) is presented the method of any one of embodiments (17)-(36), wherein the substrate further comprises silicon oxide on a surface of the substrate, and wherein at least a portion of the silicon oxide on a surface of the substrate is abraded at a silicon oxide removal rate to polish the substrate.

(38) In embodiment (38) is presented the method of embodiment (37), wherein the silicon oxide removal rate is less than 50 Å/min.

(39) In embodiment (39) is presented the method of embodiment (37) or embodiment (38), wherein the silicon oxide removal rate is less than 25 Å/min.

(40) In embodiment (40) is presented the method of any one of embodiments (37)-(39), wherein the silicon oxide removal rate is less than 10 Å/min.

(41) In embodiment (41) is presented the method of any one of embodiments (37)-(40), wherein the chemical-mechanical polishing composition provides a nickel to silicon oxide polishing selectivity of about 10:1 or higher.

(42) In embodiment (42) is presented the method of any one of embodiments (37)-(41), wherein the chemical-mechanical polishing composition provides a nickel to silicon oxide polishing selectivity of about 25:1 or higher.

(43) In embodiment (43) is presented the method of any one of embodiments (37)-(42), wherein the chemical-mechanical polishing composition provides a nickel to silicon oxide polishing selectivity of about 50:1 or higher.

(44) In embodiment (44) is presented the method of any one of embodiments (17)-(43), wherein the substrate further comprises silicon nitride on a surface of the substrate, and wherein at least a portion of the silicon nitride on a surface of the substrate is abraded at a silicon nitride removal rate to polish the substrate.

(45) In embodiment (45) is presented the method of embodiment (44), wherein the silicon nitride removal rate is less than 50 Å/min.

(46) In embodiment (46) is presented the method of embodiment (44) or embodiment (45), wherein the silicon nitride removal rate is less than 25 Å/min.

(47) In embodiment (47) is presented the method of any one of embodiments (44)-(46), wherein the silicon nitride removal rate is less than 10 Å/min.

(48) In embodiment (48) is presented the method of any one of embodiments (44)-(47), wherein the chemical-mechanical polishing composition provides a nickel to silicon nitride polishing selectivity of about 10:1 or higher.

(49) In embodiment (49) is presented the method of any one of embodiments (44)-(48), wherein the chemical-mechanical polishing composition provides a nickel to silicon nitride polishing selectivity of about 25:1 or higher.

(50) In embodiment (50) is presented the method of any one of embodiments (44)-(49), wherein the chemical-mechanical polishing composition provides a nickel to silicon nitride polishing selectivity of about 50:1 or higher.

(51) In embodiment (51) is presented the method of any one of embodiments (17)-(50), wherein the substrate further comprises titanium nitride on a surface of the substrate, and wherein at least a portion of the titanium nitride on a surface of the substrate is abraded at a titanium nitride removal rate to polish the substrate.

(52) In embodiment (52) is presented the method of embodiment (51), wherein the titanium nitride removal rate is less than 50 Å/min.

(53) In embodiment (53) is presented the method of embodiment (51) or embodiment (52), wherein the titanium nitride removal rate is less than 25 Å/min.

(54) In embodiment (54) is presented the method of any one of embodiments (51)-(53), wherein the titanium nitride removal rate is less than 10 Å/min.

(55) In embodiment (55) is presented the method of any one of embodiments (51)-(54), wherein the chemical-mechanical polishing composition provides a nickel to titanium nitride polishing selectivity of about 10:1 or higher.

(56) In embodiment (56) is presented the method of any one of embodiments (51)-(55), wherein the chemical-mechanical polishing composition provides a nickel to titanium nitride polishing selectivity of about 25:1 or higher.

(57) In embodiment (57) is presented the method of any one of embodiments (51)-(56), wherein the chemical-mechanical polishing composition provides a nickel to titanium nitride polishing selectivity of about 50:1 or higher.

EXAMPLES

These following examples further illustrate the invention but, of course, should not be construed as in any way limiting its scope.

The following abbreviations are used throughout the Examples: removal rate (RR); nickel (Ni); tetraethyl orthosilicate (TEOS); weight percentage (wt. %), parts per million (ppm), and pounds per square inch (psi). The term "selectivity" in the following examples refers to the ratio of the removal rate of the nickel layer relative to the removal rate of the silicon oxide (i.e., TEOS) layer.

Example 1

This example demonstrates the effect of abrasive on the polishing performance of a polishing composition prepared according to the invention.

Polishing Compositions 1A-1E contained 1% $H_2O_2$, 500 ppm 2-amino-2-(hydroxymethyl)propane-1,3-diol, 150 ppm of a biocide (PROXEL™ AQ), 0.25 wt. % of the abrasive set forth in Table 1, and each had a pH of approximately 7. In particular, Polishing Composition 1A contained 0.25 wt. % of a PEG-silane modified rutile $TiO_2$ abrasive, Polishing Composition 1B contained 0.25 wt. % of a negatively charged silica particle, Polishing Composition 1C contained 0.25 wt. % of a positively charged silica particle, Polishing Composition 1D contained 0.25 wt. % of a negatively charged alumina particle, and Polishing Composition 1E contained 0.25 wt. % of a negatively charged alumina particle.

Patterned substrates comprising a TEOS layer or a nickel layer were polished with Polishing Compositions 1A-1E, as defined in Table 1, using a GNP POLI 500 benchtop polishing machine at 2.5 PSI (17.2 kPa) downforce using an M2000® pad (CMC Materials, Aurora, IL), and conditioned with a A165 conditioner (3M, St. Paul, MN). Polishing parameters were as follows: headspeed=93 rpm, platen speed=87 rpm, total flow rate=70 mL/min. Removal rates were calculated by measuring the film thickness, using spectroscopic analysis with a Four-Point probe for nickel and a Filmetrics F54 for TEOS, and subtracting the final thickness from the initial thickness. The results are set forth in Table 1.

TABLE 1

Polishing Composition Removal Rates as a Function of Abrasive

| Polishing Composition | Abrasive | Ni RR (Å/min) | TEOS RR (Å/min) | Selectivity (Å/min) |
|---|---|---|---|---|
| 1A | $TiO_2$ (rutile) | 997 | 11 | 91:1 |
| 1B | $SiO_2$ (negative) | 291 | 7 | 42:1 |
| 1C | $SiO_2$ (positive) | 118 | 7 | 17:1 |
| 1D | $Al_2O_3$ (negative) | 125 | 16 | 8:1 |
| 1E | $Al_2O_3$ (negative) | 64 | 96 | 0.7:1 |

As is apparent from the results set forth in Table 1, Polishing Composition 1A, comprising a PEG-silane modified rutile $TiO_2$ abrasive, provided the highest nickel removal rate. In addition, Table 1 shows that Polishing Composition 1A exhibited the best nickel to TEOS selectivity at approximately 91:1. Thus, Table 1 shows that rutile $TiO_2$ abrasive is more effective at removing nickel, while maintaining low TEOS removal rates, when compared to silica and alumina abrasives.

Example 2

This example demonstrates the effect of $TiO_2$ abrasive on the polishing performance of a polishing composition prepared according to the invention.

Polishing Compositions 2A-2G contained 1% $H_2O_2$, 500 ppm 2-amino-2-(hydroxymethyl)propane-1,3-diol, 150 ppm of a biocide (PROXEL™ AQ), 0.25 wt. % of the abrasive set forth in Table 2, and each had a pH of approximately 7. However, Polishing Composition 2G did not include 1% $H_2O_2$, because $H_2O_2$ appeared incompatible with the Anatase (Nyacol™-TiSol-$NH_4$) abrasive included in Polishing Composition 2G. The results of polishing with Polishing Composition 2G, without 1% $H_2O_2$, are set forth in Table 2. Polishing Composition 2G, also including 1% $H_2O_2$, gave similar polishing results to those reported in Table 2.

Patterned substrates comprising a TEOS layer or a nickel layer were polished with Polishing Compositions 2A-2G, as defined in Table 2, using a GNP POLI 500 benchtop polishing machine at 2.5 PSI (17.2 kPa) downforce using an M2000® pad (CMC Materials, Aurora, IL), and conditioned with a A165 conditioner (3M, St. Paul, MN). Polishing parameters were as follows: headspeed=93 rpm, platen speed=87 rpm, total flow rate=70 mL/min. Removal rates were calculated by measuring the film thickness, using spectroscopic analysis with a Four-Point probe for nickel and a Filmetrics F54 for TEOS, and subtracting the final thickness from the initial thickness. The results are set forth in Table 2.

TABLE 2

Polishing Composition Removal Rates as a Function of $TiO_2$ Abrasive

| Polishing Composition | $TiO_2$ Phase | Surface Treatment | Size (nm) | Ni RR (Å/min) | TEOS RR (Å/min) |
|---|---|---|---|---|---|
| 2A | rutile | 2% PEG-silane, 0.1% DEQUEST ™ 2010 | 93 | 1079 | 60 |
| 2B | rutile | 4% PEG-silane, 0.1% DEQUEST ™ 2010 | 72 | 911 | 23 |
| 2C | ~90% anatase ~10% rutile | 1.1% $C_4H_{11}NO$-like species, 1.3% citric acid | 129 | 952 | 84 |
| 2D | ~90% anatase ~10% rutile | 2.6% $C_4H_{11}NO$-like species, 2% citric acid | 122 | 479 | 100 |

TABLE 2-continued

Polishing Composition Removal Rates as a Function of $TiO_2$ Abrasive

| Polishing Composition | $TiO_2$ Phase | Surface Treatment | Size (nm) | Ni RR (Å/min) | TEOS RR (Å/min) |
|---|---|---|---|---|---|
| 2E | rutile | silica-coated | 99 | 201 | 69 |
| 2F | rutile | modified silicone oil (<10%) sorbitan, (Z)-9-octadecenoate (2:3), (<10%) Stearic acid (<5%) | 234 | 996 | 98 |
| 2G (pH 8) | Anatase (Nyacol ™-TiSol-$NH_4$) | uncoated | 30 | ~0 | 17 |

As is apparent from the results set forth in Table 2, Polishing Compositions 2A-2F, containing rutile $TiO_2$, generally exhibited high nickel removal rates while maintaining low TEOS removal rates. However, polishing compositions containing an adequate amount of rutile $TiO_2$ (e.g., at the surface of the abrasive) such as Polishing Compositions 2A, 2B, 2C, and 2F exhibited higher nickel removal rates than polishing compositions containing an abrasive that was too heavily surface modified to have an adequate amount of rutile $TiO_2$ at the surface of the abrasive (e.g., Polishing Compositions 2D and 2E). In addition, Table 2 shows that Polishing Composition 2G, containing anatase $TiO_2$, did not provide any nickel removal. Thus, Table 2 shows that rutile $TiO_2$ abrasive is important for maintaining a high nickel removal rate.

Example 3

This example demonstrates the effect of pH on the polishing performance of a polishing composition prepared according to the invention.

Polishing Compositions 3A-3C contained 1% $H_2O_2$, 500 ppm of the organic polishing promoter set forth in Table 3, 150 ppm of a biocide (PROXEL™ AQ), 0.25 wt. % of a PEG-silane modified rutile $TiO_2$ abrasive, and had the pH set forth in Table 3.

Patterned substrates comprising a TEOS layer or a nickel layer were polished with Polishing Compositions 3A-3C, as defined in Table 3, using a GNP POLI 500 benchtop polishing machine at 2.5 PSI (17.2 kPa) downforce using an M2000® pad (CMC Materials, Aurora, IL), and conditioned with a A165 conditioner (3M, St. Paul, MN). Polishing parameters were as follows: headspeed=93 rpm, platen speed=87 rpm, total flow rate=70 mL/min. Removal rates were calculated by measuring the film thickness, using spectroscopic analysis with a Four-Point probe for nickel and a Filmetrics F54 for TEOS, and subtracting the final thickness from the initial thickness. The results are set forth in Table 3.

TABLE 3

Polishing Composition Removal Rates as a Function of pH

| Polishing Composition | Organic Polishing Promoter | pH | Ni RR (Å/min) | TEOS RR (Å/min) | Selectivity (Å/min) |
|---|---|---|---|---|---|
| 3A | 2-amino-2-(hydroxymethyl)propane-1,3-diol | 7 | 997 | 11 | 91:1 |
| 3B | 2-amino-2-(hydroxymethyl)propane-1,3-diol | 5 | 868 | 57 | 15:1 |
| 3C | acetic acid | 5 | 1033 | 100 | 10:1 |

As is apparent from the results set forth in Table 3, Polishing Compositions 3A-3C, having pH values ranging from 5 to 7, all exhibited high nickel removal rates. However, Polishing Composition 3C, having a pH of 5, exhibited a much higher TEOS removal rate than Polishing Compositions 3A and 3B, thereby producing a low selectivity. The same effect can be seen when comparing Polishing Compositions 3A and 3B. In particular, Polishing Composition 3B, having a pH of 5, exhibited a much higher TEOS removal rate than Polishing Composition 3A, having a pH of 7, despite all other components being identical. Thus, Table 3 shows that Polishing Compositions 3A-3C, having pH values of 5 or 7, all exhibited high nickel removal rates; however, at a lower pH of 5, the selectivity was significantly reduced as a result of higher TEOS removal rates.

Example 4

This example demonstrates the effect of an organic polishing promoter on the polishing performance of a polishing composition prepared according to the invention.

Polishing Compositions 4A-40 contained 1% $H_2O_2$, 500 ppm of the organic polishing promoter set forth in Table 4, 150 ppm of a biocide (PROXEL™ AQ), 0.25 wt. % of a PEG-silane modified rutile $TiO_2$ abrasive, and each had a pH of approximately 7.

Patterned substrates comprising a TEOS layer or a nickel layer were polished with Polishing Compositions 4A-40, as defined in Table 4, using a GNP POLI 500 benchtop polishing machine at 2.5 PSI (17.2 kPa) downforce using an M2000® pad (CMC Materials, Aurora, IL), and conditioned with a A165 conditioner (3M, St. Paul, MN). Polishing parameters were as follows: headspeed=93 rpm, platen speed=87 rpm, total flow rate=70 mL/min. Removal rates were calculated by measuring the film thickness, using spectroscopic analysis with a Four-Point probe for nickel and a Filmetrics F54 for TEOS, and subtracting the final thickness from the initial thickness. The results are set forth in Table 4.

TABLE 4

Polishing Composition Removal Rates as a Function of Organic Polishing Promoter

| Polishing Composition | Organic Polishing Promoter | Ni RR (Å/min) | TEOS RR (Å/min) |
|---|---|---|---|
| 4A | (1-hydroxyethane-1,1-diyl)bis(phosphonic acid) | 113 | 1 |
| 4B | none | 320 | — |
| 4C | urea | 372 | 35 |
| 4D | uric acid | 376 | 9 |
| 4E | 2-aminoethyl hydrogen sulfate | 422 | 19 |
| 4F | taurine | 460 | 8 |
| 4G | phthalic acid | 466 | 4 |
| 4H | ethanolamine | 516 | 23 |
| 4I | oxalic acid | 566 | 7 |
| 4J | succinic acid | 608 | 7 |
| 4K | 2-amino-2-methyl-1-propanol | 611 | 5 |
| 4L | 2-[bis(2-hydroxyethyl)amino]-2-(hydroxymethyl)propane-1,3-diol | 642 | 1 |
| 4M | 2-amino-2-(hydroxymethyl)propane-1,3-diol | 843 | 12.5 |
| 4N | L-cysteine | 952 | 54 |
| 4O | 2-aminoethanethiol | 1177 | 33 |

As is apparent from the results set forth in Table 4, Polishing Compositions 4C-4O, comprising the organic polishing promoters set forth in Table 4, provided higher nickel removal rates than Polishing Composition 4B (containing no polishing promoter as a control) and Polishing Composition 4A (containing (1-hydroxyethane-1,1-diyl)bis (phosphonic acid) as a nickel polishing inhibitor), while maintaining reasonably low TEOS removal rates. In addition, Polishing Compositions 4K-4O, containing an organic polishing promoter comprising an amine, a thiol, and/or a hydroxyl exhibited the highest nickel removal rates. Thus, Table 4 shows that polishing compositions containing a rutile $TiO_2$ abrasive and an organic polishing promoter of the invention exhibit high nickel removal rates, while maintaining low TEOS removal rates.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:

(a) a rutile titanium dioxide abrasive, wherein the rutile titanium dioxide abrasive is surface-modified with polyethylene glycol, silane, or a combination thereof;

(b) an organic polishing promoter comprising a carboxylic acid, a urea, an amine, a thiol, a hydroxyl, an amide, a sulfonic acid, salts thereof, or combinations thereof; and (c) water, wherein the chemical-mechanical polishing composition has a pH of about 5 to about 12.

2. The polishing composition of claim 1, wherein the polishing composition has a pH of about 6 to about 8.

3. The polishing composition of claim 1, wherein the polishing composition comprises about 0.05 wt. % to about 5 wt. % of the rutile titanium dioxide abrasive.

4. The polishing composition of claim 1, wherein the rutile titanium dioxide abrasive is surface-modified with a combination of polyethylene glycol and silane.

5. The polishing composition of claim 1, wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl) propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof.

6. The polishing composition of claim 1, wherein the organic polishing promoter comprises (i) an amine and (ii) a thiol and/or a hydroxyl.

7. The polishing composition of claim 6, wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl) propane-1,3-diol, 2-aminoethanethiol, ethanolamine, L-cysteine, salts thereof, and combinations thereof.

8. The polishing composition of claim 1, wherein the polishing composition comprises about 10 ppm to about 10,000 ppm of the organic polishing promoter.

9. A method of chemically-mechanically polishing a substrate comprising:

(i) providing a substrate comprising nickel on a surface of the substrate, (ii) providing a polishing pad, (iii) providing a chemical-mechanical polishing composition comprising a rutile titanium dioxide abrasive, wherein the rutile titanium dioxide abrasive is surface-modified with polyethylene glycol, silane, or a combination thereof, (iv) contacting the substrate with the polishing pad and the chemical-mechanical polishing composition, and (v) moving the polishing pad and the chemical-mechanical polishing composition relative to the substrate, wherein at least a portion of the nickel on a surface of the substrate is abraded at a nickel removal rate to polish the substrate.

10. The method of claim 9, wherein the polishing composition further comprises:

(a) an organic polishing promoter comprising a carboxylic acid, a urea, an amine, a thiol, a hydroxyl, an amide, a sulfonic acid, salts thereof, or combinations thereof; and (b) water, wherein the chemical-mechanical polishing composition has a pH of about 5 to about 12.

11. The method of claim 10, wherein the polishing composition has a pH of about 6 to about 8.

12. The method of claim 10, wherein the polishing composition comprises about 0.05 wt. % to about 5 wt. % of the rutile titanium dioxide abrasive.

13. The method of claim 9, wherein the rutile titanium dioxide abrasive is surface-modified with a combination of polyethylene glycol and silane.

14. The method of claim 10, wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, 2-aminoethyl hydrogen sulfate, ethanolamine, L-cysteine, oxalic acid, phthalic acid, succinic acid, taurine, urea, uric acid, salts thereof, and combinations thereof.

15. The method of claim 10, wherein the organic polishing promoter comprises (i) an amine and (ii) a thiol and/or a hydroxyl.

16. The method of claim 10, wherein the organic polishing promoter is selected from 2-amino-2-methyl-1-propanol, 2-[bis(2-hydroxyethyl)amino]-2-(hydroxymethyl)propane-1,3-diol, 2-amino-2-(hydroxymethyl)propane-1,3-diol, 2-aminoethanethiol, ethanolamine, L-cysteine, salts thereof, and combinations thereof.

17. The method of claim 10, wherein the polishing composition comprises about 10 ppm to about 10,000 ppm of the organic polishing promoter.

18. The method of claim 9, wherein the substrate further comprises silicon oxide on a surface of the substrate, and wherein at least a portion of the silicon oxide on a surface of the substrate is abraded at a silicon oxide removal rate to polish the substrate.

* * * * *